(12) United States Patent
Yoshida et al.

(10) Patent No.: US 7,999,898 B2
(45) Date of Patent: Aug. 16, 2011

(54) ACTIVE MATRIX TYPE LIQUID CRYSTAL DISPLAY DEVICE

(75) Inventors: Hiroshi Yoshida, Toyonaka (JP);
Yasutoshi Tasaka, Minato-ku (JP);
Yoshimizu Moriya, Matsusaka (JP);
Yasuyoshi Kaise, Matsusaka (JP);
Mutsumi Nakajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 171 days.

(21) Appl. No.: 12/303,661

(22) PCT Filed: Apr. 24, 2007

(86) PCT No.: PCT/JP2007/058809
§ 371 (c)(1),
(2), (4) Date: Dec. 5, 2008

(87) PCT Pub. No.: WO2008/023479
PCT Pub. Date: Feb. 28, 2008

(65) Prior Publication Data
US 2010/0118248 A1     May 13, 2010

(30) Foreign Application Priority Data
Aug. 25, 2006 (JP) ................................ 2006-229863

(51) Int. Cl.
*G02F 1/1343*     (2006.01)
(52) U.S. Cl. .................. 349/143; 349/139; 349/146
(58) Field of Classification Search .................. None
See application file for complete search history.

(56) References Cited

U.S. PATENT DOCUMENTS

| 5,426,523 | A | 6/1995 | Shimada et al. |
| 2002/0003588 | A1 | 1/2002 | Okada et al. |
| 2002/0105613 | A1* | 8/2002 | Yamakita et al. ............ 349/143 |
| 2004/0017521 | A1 | 1/2004 | Okada et al. |
| 2005/0046772 | A1 | 3/2005 | Kubo et al. |
| 2005/0098781 | A1* | 5/2005 | Park et al. ....................... 257/59 |
| 2005/0140916 | A1 | 6/2005 | Kume et al. |
| 2007/0090361 | A1* | 4/2007 | Hoshino ........................ 257/59 |

FOREIGN PATENT DOCUMENTS

| JP | 2001-222026 | 8/2001 |
| JP | 2003-315803 | 11/2003 |

OTHER PUBLICATIONS

International Preliminary Report on Patentability for PCT/JP2007/058809, report dated Mar. 3, 2009 (English version).*
International Search Report for PCT/JP2007/058809, mailed Jun. 5, 2007.

* cited by examiner

*Primary Examiner* — Mike Stahl
(74) *Attorney, Agent, or Firm* — Nixon & Vanderhye P.C.

(57) ABSTRACT

An active matrix liquid crystal display device is provided in which decrease in the aperture ratio is prevented, and deterioration in display quality is reduced by preventing liquid crystal molecules in a region of a pixel electrode which region faces a bus line from aligning in two or more directions. A liquid crystal panel in the active matrix liquid crystal display device includes a plurality of pixel electrodes (2) in array; and bus lines (42) arranged in a grid so as to surround each of the pixel electrodes (2), the pixel electrodes (2) each including a prominence (50) overlapping an adjacent one of the bus lines (42) in a top view, wherein the respective prominences (50) of each adjacent two of the pixel electrodes (2) facing each other across an adjacent one of the bus lines (42) overlap the bus line (42) at positions different from each other with respect to a direction in which the bus line (42) extends.

14 Claims, 10 Drawing Sheets

F I G. 2
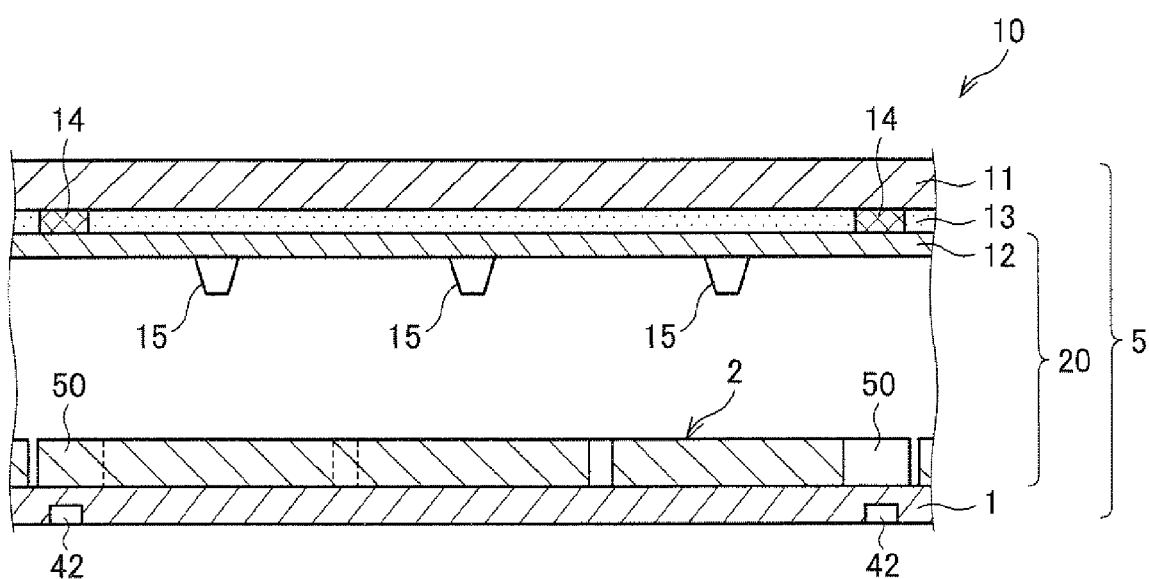

ACTIVE MATRIX TYPE LIQUID CRYSTAL DISPLAY DEVICE

This application is the U.S. national phase of International Application No. PCT/JP2007/058809, filed 24 Apr. 2007, which designated the U.S. and claims priority to Japanese Patent Application No. 2006-229863, filed 25 Aug. 2006, the entire contents of each of which are hereby incorporated by reference.

TECHNICAL FIELD

The present invention relates to an active matrix liquid crystal display device having a pixel arrangement in which a bus line is disposed between adjacent pixels, and, in particular, to an active matrix liquid crystal display device having an improved display quality brought about by controlling the alignment of liquid crystal in a region adjacent to a bus line.

BACKGROUND ART

Conventionally, there has been widely used an active matrix liquid crystal display device which includes a bus line, such as a gate bus line, between adjacent pixels.

In the above active matrix liquid crystal display device having a vertically aligned liquid crystal, an electric field generated by the bus line may cause discontinuity in the alignment direction of liquid crystal molecules which lie in a region of the pixel electrode which region faces the bus line. This deteriorates the display quality. The following description explains this with reference to FIGS. 6, 9, and 10 (a) through 10 (b).

FIG. 9 (a) is a partial plan view of conventional pixel electrodes 102 in adjacent pixels between which no gate bus line 142 is disposed. FIG. 9 (b) is a partial plan view of conventional pixel electrodes 102 in adjacent pixels between which a gate bus line 142 is disposed.

FIG. 6 (a) shows how liquid crystal molecules in the pixels shown in FIG. 9 (a) align. FIGS. 6 (b) and 6 (c) show how liquid crystal molecules in the pixels shown in FIG. 9 (b) align. As shown in FIGS. 9 (a) and 9 (b), the gate bus line 142 between the adjacent pixels is disposed in a direction which crosses a source bus line 143 orthogonally and is parallel to one side of each of the pixel electrodes 102.

In a case of the conventional pixel electrodes 102 in the adjacent pixels between which no gate bus line 142 is disposed, as shown in FIG. 6 (a), the liquid crystal molecules align radially from an alignment controlling projection 115 which is provided on a counter electrode.

Meanwhile, in a case of the conventional pixel electrodes 102 in the adjacent pixels between which a gate bus line 142 is disposed, the alignment of the liquid crystal molecules in each of regions S9 and S10 is different from the alignment in the other region of the corresponding one of the pixel electrodes 102 (see FIGS. 6 (b) and 6 (c)). The regions S9 and S10 are regions of the respective pixel electrodes 102 which regions face the gate bus line 142. This alignment abnormality has two types as shown in FIGS. 6 (b) and 6 (c), respectively. When not only one of these types, but multiple types of alignment state occur, display irregularity is caused, and thereby the display quality is deteriorated. In other words, occurrence of alignment abnormality causes no display irregularity if the alignment state has only a single type.

The following description deals with discontinuity of an alignment direction of liquid crystal molecules 121. This discontinuity causes the above multiple types of alignment state.

FIG. 10 (a) is a cross-sectional view taken along line A-A of FIG. 9 (a), i.e., taken along line G-G of FIG. 6 (a). FIG. 10 (b) is a cross-sectional view taken along line B-B of FIG. 9 (b), i.e., taken along line H-H of FIG. 6 (b).

In a case of the conventional pixel electrodes 102 in the adjacent pixels between which no gate bus line 142 is disposed, no discontinuity is caused to the alignment direction of liquid crystal molecules 121 between the adjacent pixel electrodes 102 (see FIG. 10 (a)).

In contrast, in a case of the conventional pixel electrodes 102 in the adjacent pixels between which a gate bus line 142 is disposed, discontinuity is caused to the alignment direction of liquid crystal molecules 121 between the adjacent pixel electrodes 102, i.e., above the gate bus line 142 (see FIG. 10 (b)).

This is apparently because the equipotential line is distorted by the influence of the gate bus line 142, and the distortion causes discontinuity in the alignment direction of the liquid crystal molecules 121. This distortion of equipotentiality is likely to occur particularly when the gate bus line 142 has a deep negative polarity.

This discontinuity of the alignment direction occurs in plural types and in an irregular manner. This causes deterioration in the display quality.

In view of this, the following arts are suggested for the purpose of reducing such deterioration in display quality.

Patent Document 1 suggests an art for additionally providing a light-blocking member which covers a bus line. The light-blocking member is provided so as to prevent light leakage caused by discontinuity of the alignment direction of liquid crystal molecules in a region adjacent to the bus line.

For the same purpose as described in Patent Document 1, Patent Document 2 suggests an art for providing pixel electrodes that partially overlap a bus line. It is intended by this art that, by overlapping the bus line with the pixel electrodes, it becomes impossible for an oblique electric field generated at the edges of the bus line to influence liquid crystal molecules, thereby to consequently reducing discontinuity of the alignment direction of the liquid crystal molecules.

[Patent Document 1] Japanese Unexamined Patent Application Publication No. 313197/1993 (Tokukaihei 5-313197; published on Nov. 26, 1993)

[Patent Document 2] Japanese Unexamined Patent Application Publication No. 70151/2005 (Tokukai 2005-70151; published on. Mar. 17, 2005)

DISCLOSURE OF INVENTION

However, the active matrix liquid crystal display device described in Patent Document 1 has a problem that the light-blocking member which is additionally provided causes a decrease in the aperture ratio.

In addition, according an active matrix liquid crystal display device described in Patent Document 2, it is intended as described above that the alignment abnormality occurring near the bus line is improved by causing an end of each of the pixel electrodes to overlap the bus line. In other words, the bus line is substituted for a light-blocking member in order to improve the display quality.

However, this active matrix liquid crystal display device also has the following problem: when, for example, the distance between adjacent pixel electrodes is fixed, the bus line needs to be widened. This decreases the aperture ratio, consequently Furthermore, this active matrix liquid crystal display device has another problem that plural types of alignment direction discontinuity cannot be prevented from occurring in the liquid crystal molecules in a region adjacent to the bus line, i.e., in a region of each of the pixel electrodes which region faces the bus line.

The present invention has been accomplished in view of the above problems of the conventional active matrix liquid crystal display devices. An object of the present invention is to provide an active matrix liquid crystal display device including a bus line between adjacent pixel electrodes, which display device realizes a reduced deterioration in the display quality by preventing decrease in the aperture ratio and multiple alignment directions of liquid crystal molecules in a region of each of the pixel electrodes which region locates beside the bus line.

In order to attain the object, an active matrix liquid crystal display device of the present invention is an active matrix liquid crystal display device of a vertical alignment mode including a liquid crystal panel including: a plurality of pixel electrodes in array; and a bus line between each adjacent pixel electrode, wherein: each pixel electrode includes a prominence overlapping one of the bus lines which is adjacent to the pixel electrode in a top view; and the prominences of each adjacent pixel electrode facing each other across a certain bus line overlap the certain bus line at positions different from each other with respect to a direction in which the certain bus line extends.

A conventional active matrix liquid crystal display device of a vertical alignment mode has had a problem of decreased display quality. This problem occurs because liquid crystal molecules in regions of pixel electrodes on either side of a bus line are aligned in multiple directions due to an influence of an electric field generated by the bus line.

In view of this, according to the present invention, the pixel electrodes are each provided with a prominence overlapping an adjacent bus line in a top view, and the prominences are disposed at positions difference from each other with respect to a direction in which the bus line extends. This causes each of the regions of the pixel electrodes which regions face the bus line to have liquid crystal molecules which are aligned in a single direction. This allows reducing deterioration in the display quality.

Further, according to the present invention, a portion of each of the pixel electrodes is disposed so as to overlap the bus line. Thus, alignment abnormality in the regions adjacent to the bus line can be prevented with use of alignment control action of liquid crystal molecules which lie above the bus line. This allows reducing deterioration in the display quality, without providing a conventional light-blocking member in the aperture.

In addition, according to the present invention, it is not necessary to widen a light-blocking member for the purpose of hiding the region of each of the pixel electrodes which region faces the bus line. This allows preventing decrease in the aperture ratio.

As described above, according to the active matrix liquid crystal display device of the present invention, it is possible to reduce deterioration in the display quality by preventing liquid crystal molecules in a region of each of the pixel electrodes which region faces the bus line from aligning in multiple directions, as well as to prevent decrease in the aperture ratio.

The active matrix liquid crystal display device of the present invention may preferably be arranged such that the prominence is disposed across the bus line so as to cover both edges of the bus line.

According to the above invention, the prominence is disposed so as to cover both edges of the bus line. Thus, the liquid crystal molecules in the prominence are less influenced by an oblique electric field generated at the edges of the bus line. This allows reducing deterioration in the display quality.

In addition, since the prominence is disposed across the bus line, a portion of the edges of the prominence (i.e., the edges of the pixel electrode) which portion faces the bus line is smaller. In other words, a smaller portion of the edges of the pixel electrode lies above the bus line. This reduces the influence of alignment abnormality occurring in an area where the edges of the pixel electrode face the bus line, and further reduces deterioration in the display quality.

The active matrix liquid crystal display device of the present invention may be arranged such that the pixel electrodes are each includes at least two sub-pixel electrodes. However, it should be noted that the pixel electrodes are not necessarily made up of respective sub-pixel electrodes. They may be each made up of a single pixel electrode.

The active matrix liquid crystal display device of the present invention may preferably be such that the liquid crystal panel further includes: a counter electrode facing the pixel electrodes; and a liquid crystal layer, the counter electrode having an alignment controlling projection on a side that faces the liquid crystal layer, the alignment controlling projection being disposed at a position opposite from a center of corresponding one of the pixel electrodes. In addition, the active matrix liquid crystal display device of the present invention may preferably be arranged such that the liquid crystal panel further includes: a counter electrode facing the sub-pixel electrodes; and a liquid crystal layer on a side of the counter electrode, the counter electrode having an alignment controlling projection on a side that faces the liquid crystal layer, the alignment controlling projection being disposed at a position opposite from a center of corresponding one of the sub-pixel electrodes.

The active matrix liquid crystal display device of the present invention may preferably be such that the liquid crystal panel further includes: a counter electrode facing the pixel electrodes, the counter electrode having a gap at a position opposite from a center of each of the pixel electrodes. In addition, the active matrix liquid crystal display device of the present invention may preferably be arranged such that the liquid crystal panel further includes: a counter electrode facing the sub-pixel electrodes, the counter electrode having a gap at a position opposite from a center of each of the sub-pixel electrodes.

According to the above invention, an alignment controlling projection or a gap is provided in the counter electrode at a position opposite from the center of each of the pixel electrodes. This facilitates forming an axially symmetric alignment of liquid crystal molecules in a case of a vertical alignment liquid crystal.

The active matrix liquid crystal display device of the present invention may preferably be such that at least part of the prominence is disposed in a non light-blocking region of the liquid crystal panel. In addition, the active matrix liquid crystal display device of the present invention may preferably be arranged such that the prominence has a portion beyond the bus line that the prominence overlaps, and at least part of the portion is disposed in a non light-blocking region of the liquid crystal panel. The non light-blocking region refers to a region of the liquid crystal panel in which region light is not blocked by a light-blocking member such as a black matrix and a metal film.

According to the above invention, the liquid crystal molecules in the prominence also contribute to carrying out of a display. This allows a bright display to be carried out.

The active matrix liquid crystal display device of the present invention may preferably be such that the bus line is a gate bus line. In addition, the active matrix liquid crystal display device of the present invention may preferably be arranged such that the bus line is a source bus line.

According to the above invention, the alignment direction of the liquid crystal molecules in the prominence can easily be controlled.

The active matrix liquid crystal display device of the present invention may preferably be such that the liquid crystal panel further includes: a region between each adjacent pixel electrode facing each other across the bus line; and a light-blocking member, the region including a portion devoid of the prominence, the light-blocking member being disposed in the portion.

According to the above invention, light is blocked in a region between each adjacent two of the pixel electrodes in which region the prominence is not provided and therefore the alignment direction of liquid crystal molecules tends to be instable. Consequently, it is possible to reduce deterioration in the display quality.

BRIEF DESCRIPTION OF DRAWINGS

FIG. 2 is a cross-sectional view taken along line A-A of FIG. 1.

FIG. 4 (b) is a cross-sectional view showing the alignment direction of the liquid crystal molecules, taken along line A-A of FIG. 3.

FIG. 6 (b) is a plan view showing the alignment direction of liquid crystal molecules in conventional pixels in which a gate bus line is disposed between adjacent pixel electrodes.

FIG. 6 (c) is a plan view showing the alignment direction of the liquid crystal molecules in the conventional pixels in which a gate bus line is disposed between adjacent pixel electrodes.

FIG. 6 (d) is a plan view showing the alignment direction of liquid crystal molecules in pixels of the embodiment of the present invention, in which pixels a gate bus line is disposed between adjacent pixel electrodes.

FIG. 7 (b) is a cross-sectional view of the pixels, taken along line B-B of FIG. 6 (b).

FIG. 7 (c) is a cross-sectional view of the pixel, taken along line C-C of FIG. 6 (b).

FIG. 7 (d) is a cross-sectional view of the pixel, taken along line D-D of FIG. 6 (c).

FIG. 7 (e) is a cross-sectional view of the pixels, taken along line E-E of FIG. 6 (d).

FIG. 7 (f) is a cross-sectional view of the pixel, taken along line F-F of FIG. 6 (d).

FIG. 9 (b) is a plan view of conventional pixel electrodes in the respective adjacent pixels between which a gate bus line is disposed.

FIG. 10 (b) is a cross-sectional view showing the alignment direction of the liquid crystal molecules, taken along line B-B of FIG. 9 (b).

DESCRIPTION OF THE NUMBERED CODES

Figure 1:
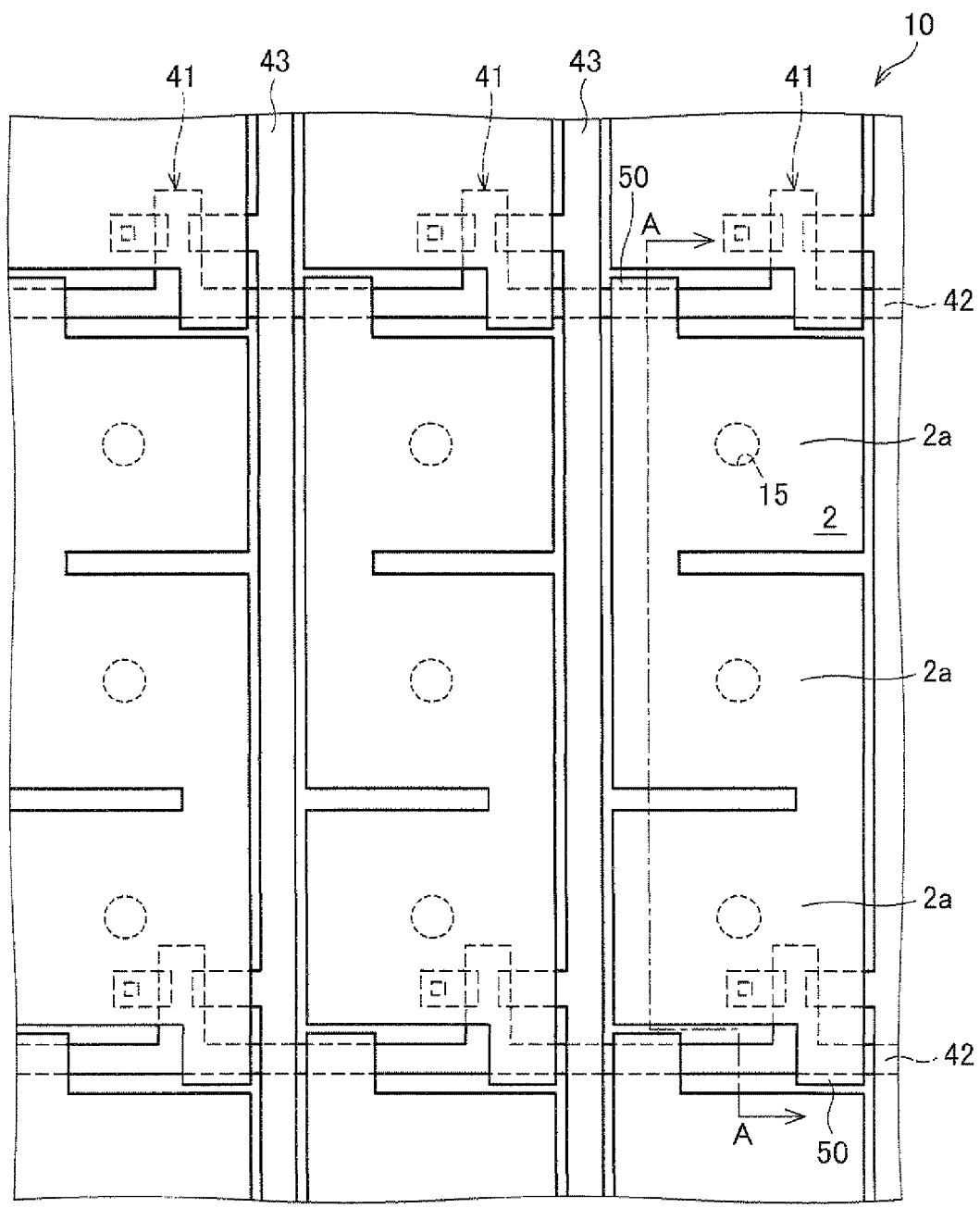
FIG. 1 is a plan view of an active matrix liquid crystal display device in accordance with an embodiment of the present invention.

1 Thin film transistor-side transparent substrate
2 Pixel electrode
2a Sub-pixel electrode
5 Liquid crystal panel
10 Active matrix liquid crystal display device
11 Counter electrode-side transparent substrate
12 Counter electrode
13 Color filter
14 Light-blocking member
15 Alignment controlling projection
20 Liquid crystal layer
21 Liquid crystal molecule
41 Active element
42 Gate bus line (bus line)
43 Source bus line (bus line)
50 Prominence
102 Pixel electrode
105 Liquid crystal panel
114 Light-blocking member
114a Extension
121 Liquid crystal molecule
142 Gate bus line

BEST MODE FOR CARRYING OUT THE INVENTION

One embodiment of the present invention is described below with reference to FIGS. 1 through 7 (a) to 7 (f).

The following description deals with an arrangement of an active matrix liquid crystal display device 10 of the present embodiment, with reference to FIGS. 1 and 2. FIG. 1 is a plan view of the active matrix liquid crystal display device 10 of the present embodiment. FIG. 2 is a cross-sectional view taken along line A-A of FIG. 1.

The active matrix liquid crystal display device 10 of the present embodiment is a color active matrix liquid crystal display device. The active matrix liquid crystal display device 10 of the present embodiment includes a liquid crystal panel 5. The liquid crystal panel 5 includes, as shown in FIG. 2: a thin film transistor-side transparent substrate 1 made up, for example, of a glass substrate; a counter electrode-side transparent substrate 11 provided so as to face the thin film transistor-side transparent substrate 1; and a vertically aligned-liquid crystal layer between the thin film transistor-side transparent substrate 1 and the counter electrode-side transparent substrate 11. A vertical alignment film (not shown) is provided on a side of each of the thin film transistor-side transparent substrate 1 and the counter electrode-side transparent substrate 11 which side is in contact with the liquid crystal layer 20. When no voltage is applied, liquid crystal molecules 21 of the liquid crystal layer 20 align substantially vertically to the respective surfaces of the vertical alignment films. The liquid crystal layer 20 contains a nematic liquid crystal material having a negative dielectric anisotropy.

In more details, the liquid crystal panel 5 of the active matrix liquid crystal display device 10 includes: pixel electrodes 2 on the thin film transistor-side transparent substrate 1; and a counter electrode 12 on the counter electrode-side transparent substrate 11. Pixels are defined by the pixel electrodes 2, the counter electrode 12, and the liquid crystal layer 20, which is provided between the pixel electrode 2 and the counter electrode 12. Both of the pixel electrodes 2 and the counter electrode 12 are respectively from transparent conductive layers made from indium tin oxide. The side of the counter electrode-side transparent substrate 11 which side faces the liquid crystal layer 20 has: color filters 13 provided so as to correspond to the respective pixels; and black matrices, serving as a light-blocking member 14, between adjacent ones of the color filters 13. The counter electrode 12 is disposed on the color filters 13 and the black matrices.

As shown in FIG. 1, the pixel electrodes 2 are provided in the liquid crystal panel 5 so as to sequentially correspond to the colors red, green, and blue, respectively. The pixel electrodes 2 each include three sub-pixel electrodes 2a. The sub-pixel electrodes 2a are substantially square. However, the shape of the sub-pixel electrodes 2a is not limited to this, and may be a polygon such as a rectangle, a pentagon, and a hexagon, a circle, or an ellipse.

The counter electrode 12 has alignment controlling projections 15 on its surface facing the liquid crystal layer. The alignment controlling projections 15 are located respectively at positions opposite from the respective centers of the sub-pixel electrodes 2a. The alignment controlling projections 15 are convex in cross section and circular in the planar shape. When a predetermined voltage is applied to the liquid crystal layer 20 disposed below the alignment controlling projections 15, the liquid crystal molecules 21 in the liquid crystal layer 20 align axisymmetrically along of the respective central axes of the alignment controlling projections 15. In other words, the alignment controlling projections 15 serve to fix the central axes for the axisymmetric alignment.

The voltage applied across the sub-pixel electrode 2a and the counter electrode 12 generates an oblique electric field around each of the alignment controlling projections 15. This oblique electric field controls the direction in which the liquid crystal molecules 21 are tilted. This allows the liquid crystal panel 5 to have a wide viewing angle.

The alignment controlling projections 15 provided so as to fix the central axes for the axisymmetric alignment are preferably circular as exemplified here. However, the shape of the alignment controlling projections 15 is not limited to this. It should be noted that a polygon having four or more angles is preferable, and an equilateral polygon is more preferable for the purpose of causing the alignment control action to be exerted substantially equally in all directions. The cross-sectional shape of the alignment controlling projections 15 as viewed from the front is not necessarily a trapezoid as in the present embodiment. It may be a rectangle or a triangle, for example. Further, an alignment control may be carried out by providing, in place of the alignment controlling projections, gaps, i.e., openings in which an electrode layer is not formed, at positions in the counter electrode facing the pixel electrodes which positions are opposite from the respective centers of the pixel electrodes. The shape of the gaps is not limited. It may be a circle or a polygon.

The active matrix liquid crystal display device 10 includes a light-blocking region between adjacent pixels. The light-blocking region refers to (i) a region in which light is blocked by, for example, thin film transistors, gate bus lines, and source bus lines which are all disposed in an area surrounding the pixel electrodes 2 on the thin film transistor-side transparent substrate 1, and to (ii) a region in which light is blocked by the black matrices serving as the light-blocking member 14 on the counter electrode-side transparent substrate 11. The light-blocking region does not contribute to carrying out of a display.

The thin film transistor-side transparent substrate 1 of the present embodiment includes, on its surface facing the liquid crystal layer 20, circuit elements such as: active elements 41 such as thin film transistors; gate bus lines 42; and source bus lines 43. The gate bus lines 42 and the source bus lines 43 are connected with the respective thin film transistors.

Figure 3:
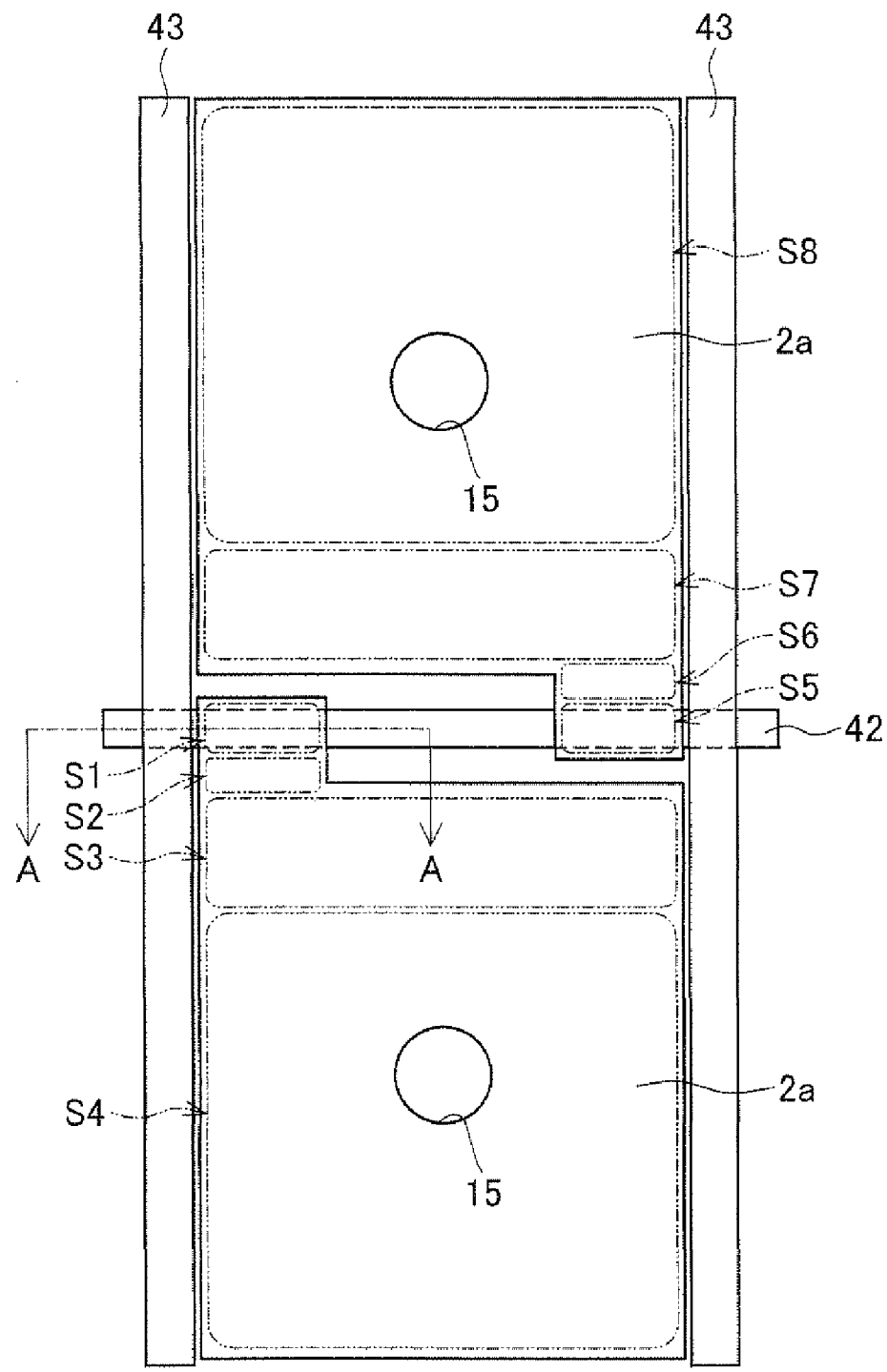
FIG. 3 is a plan view of pixel electrodes in the active matrix liquid crystal display device.

The following description deals with the shape of the pixel electrodes 2 included in the active matrix liquid crystal display device 10 of the present embodiment. FIG. 3 is a plan view of the pixel electrodes 2 in the active matrix liquid crystal display device 10 of the present embodiment.

As shown in FIG. 3, each of the pixel electrodes 2 is provided with a prominence 50 which extends from a portion of the pixel electrode 2 which portion faces an adjacent one of the gate bus lines 42. The prominence 50 overlaps and extends beyond the gate bus line 42. In other words, each of the pixel electrodes 2 is shaped so that a portion of it crosses over an adjacent one of the gate bus line 42. The following description explains the shape of the prominence 50 in detail.

The prominences 50 are quadrangular, and specifically, rectangular. Regarding the size of the quadrangular prominence 50, a transverse side of the quadrangular, i.e., a side extending parallel to the gate bus line 42 is substantially a quarter in length of the width direction side of the sub-pixel electrode 2a. The length of a transverse side of each of the prominence 50 is not particular limited. It may be a range from 5 to 10 µm, and in particular, 7 µm as other examples. The width of the sub-pixels electrodes 2a of the present embodiment is in the order of 60 µm. An overly large width of the sub-pixel electrodes 2a results in a larger width of the portion which is affected by a gate electric potential from the gate bus line 42. In this case, the effect of the prominence 50 may be decreased.

A longitudinal side of the quadrangular prominence 50, i.e., a side extending parallel to the source bus line 43, is substantially a third in length of the distance between adjacent ones of the sub-pixel electrodes 2a, 2a.

The prominences 50 extend from the sides of the sub-pixel electrodes 2a which sides face the adjacent gate bus line 42, toward the gate bus line 42. Specifically, each of the quadrangular prominences 50 is provided so that one of its longitudinal sides is aligned with one of the longitudinal sides of the sub-pixel electrode 2a. In other words, each of the prominences 50 extends from a corner of the sub-pixel electrode 2a so that one of the longitudinal sides of the prominence 50 and one of the longitudinal sides of the sub-pixel electrode 2a form a continuous straight line. Instead of the corner of the sub-pixel electrode 2a, the prominence 50 may be formed at a position which is a certain distance apart from the corner.

The prominences 50 extending from the respective sub-pixel electrodes 2a, 2a which face each other across the gate bus line 42 are arranged so as to lie at different positions with respect to the direction in which the bus line extends. Specifically, of the two opposite sub-pixel electrodes 2a, 2a, the one which lies below the gate bus line 42 with respect to the above longitudinal direction across the gate bus lines 42 is provided with a prominence 50 which extends upwardly from an upper left portion of the sub-pixel electrode 2a. Meanwhile, the other sub-pixel electrode 2a which lies above the gate bus line 42 with respect to the above longitudinal direction is provided with a prominence 50 which extends downwardly from a lower right portion of the sub-pixel electrode 2a. In other words, the prominences 50 extending from the two respective sub-pixel electrodes 2a lie diagonally to each other across the gate bus line 42.

In consequence, the prominences 50 extending from the two respective sub-pixels 2a, 2a do not overlap the same portion of the gate bus line 42 with respect to the direction in which the gate bus line 42 extends. This allows the portions of the respective pixel electrodes 2 which portions lie above the gate bus line 42 to be arranged asymmetrically with respect to the gate bus line 42.

The active matrix liquid crystal display device 10 further includes a pair of polarizing plates (not shown; the description of them is omitted above) which are arranged so as to face each other through the thin film transistor-side transparent substrate 1 and the counter electrode-side transparent substrate 11. The pair of the polarizing plates are arranged so that their respective transmission axes cross each other orthogonally.

According to the active matrix liquid crystal display device 10 of the present embodiment, the transparent electrode is segmented into three sub-pixels. However, neither the number of parts into which the transparent electrode is segmented nor the position of such segmentation, i.e., the position of the slit which is formed between adjacent sub-pixel electrodes is particularly limited.

The active matrix liquid crystal display device 10 of the present embodiment can be produced by a conventional production method. Specifically, the shape of a pattern mask is changed as appropriate so that, when pixel electrodes 2a are formed, prominences 50 in a desired shape will be provided which extend from the respective pixel electrodes 2a.

The following description deals with how the active matrix liquid crystal display device 10 of the present embodiment functions. As recited above, FIG. 3 is a plan view of the pixel electrodes of the present embodiment. It also shows the definitions of each region in the pixel electrodes 2, for convenience of the explanation below. Specifically, each of regions S1 and S5 refers to a region of the pixel electrode 2 which region overlaps the gate bus line 42. Each of regions S2 and S6 refers to a region of the pixel electrode 2 which region is adjacent to the position of the pixel electrode 2 from which position a prominence 50 extends. Each of regions S3 and S7 refers to a region of the pixel electrode 2 which region faces the gate bus line 42. Each of regions S4 and S8 refers to a region of the pixel electrode 2 which region is adjacent to the center of the pixel electrode 2.

The function of the active matrix liquid crystal display device 10 of the present embodiment is as follows. First, the alignment of the liquid crystal molecules 21 in each of the regions S1 and S5 is controlled in a single direction. The alignment directions thus controlled are propagated to the regions S2 and 56, and then to the regions S3 and S7, respectively. As a result, the alignment of the liquid crystal molecules 21 in each of the regions S3 and S7 is controlled in a single direction. The following explains this step by step.

The region S1 will be explained first. Specifically, the alignment direction of the liquid crystal molecules 21 in the region S1 will be explained with respect to (i) a planar direction of the liquid crystal panel 5, i.e., the direction parallel to the thin film transistor-side transparent substrate 1, and to (ii) a thickness direction of the liquid crystal panel 5, individually.

The alignment direction with respect to the planar direction of the liquid crystal panel 5 is as follows. The liquid crystal molecules 21 in the region S1 align so that the long axes of the respective liquid crystal molecules 21 are parallel to the gate bus line 42 with respect to the planar direction of the liquid crystal panel 5. In other words, the liquid crystal molecules 21 align in a uniform direction in such a manner that the long axes lie in the direction in which the gate bus line 42 extends. This is apparently because the liquid crystal molecules 21 are influenced by an electric field generated by the gate bus line 42.

Figure 4:
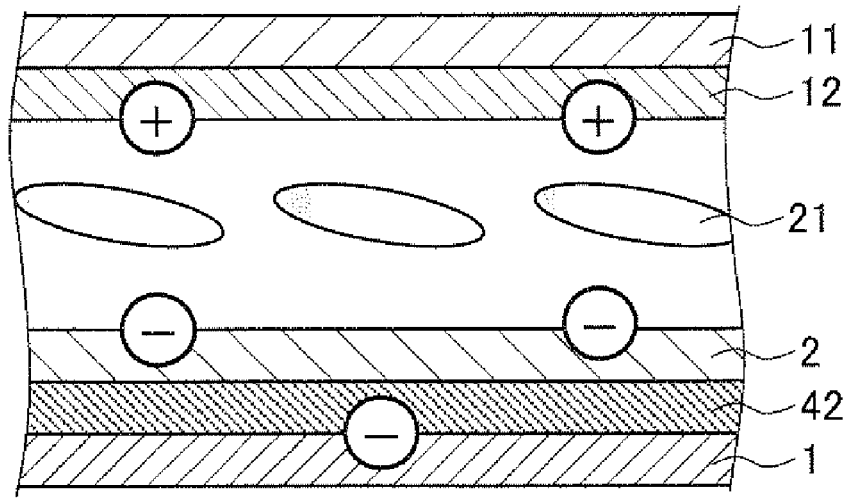
FIG. 4 (a) is a cross-sectional view showing the alignment direction of liquid crystal molecules, taken along line A-A of FIG. 3.
Figure 4:
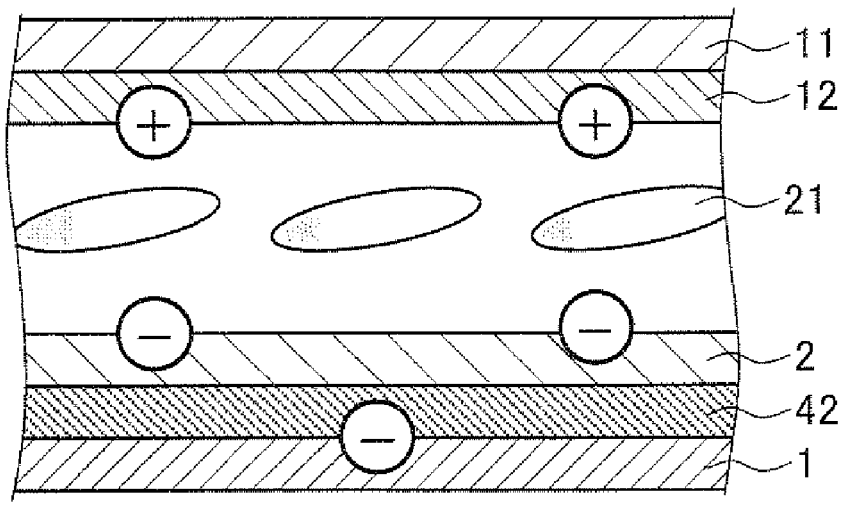

With reference to FIGS. 4 (*a*) and 4 (*b*), the following description deals with the alignment direction of the liquid crystal molecules 21 in the region S1 with respect to the thickness direction of the liquid crystal panel 5.

FIGS. 4 (*a*) and 4 (*b*) are each a cross section showing the alignment direction of the liquid crystal molecules 21, taken along line A-A of FIG. 3. In other words, FIGS. 4 (*a*) and 4 (*b*) each show the alignment direction of the liquid crystal molecules 21 in the region S1 of FIG. 3 in which region the pixel electrode 2 and the gate bus line 42 overlap each other.

The liquid crystal molecules 21 in the region S1 align only in a single direction parallel to the gate bus line 42, with respect to the planar direction. In contrast, with respect to the thickness direction of the liquid crystal panel 5, the liquid crystal molecules 21 may align, in principle, in the two directions shown in FIGS. 4 (*a*) and 4 (*b*), respectively. Specifically, in terms of which end of the long axis of each liquid crystal molecule 21 is tilted toward the counter electrode-side transparent substrate 11, two types of alignment directions may occur, i.e., (i) an alignment direction in which the left end of the long axis of each liquid crystal molecule 21 is tilted toward the counter electrode-side transparent substrate 11 as shown in FIG. 4 (*a*), and (ii) an alignment direction in which the right end of the long axis of each liquid crystal molecule 21 is tilted toward the counter electrode-side transparent substrate 11 as shown in FIG. 4 (*b*).

However, only either one of the two alignment directions occurs in the active matrix liquid crystal display device 10 of the present embodiment. The reason only one type of alignment direction selectively occurs is as follows. Since each of the pixel electrodes 2 is provided with a prominence 50, an oblique electric field is generated adjacently to a region in which the prominence 50 overlaps the gate bus line 42. As a result, the alignment direction is influenced by this oblique electric field.

The following description takes for example a case in which the liquid crystal molecules 21 in the region S1 align in the direction shown in FIG. 4 (*a*) out of the above two alignment directions.

Figure 5:
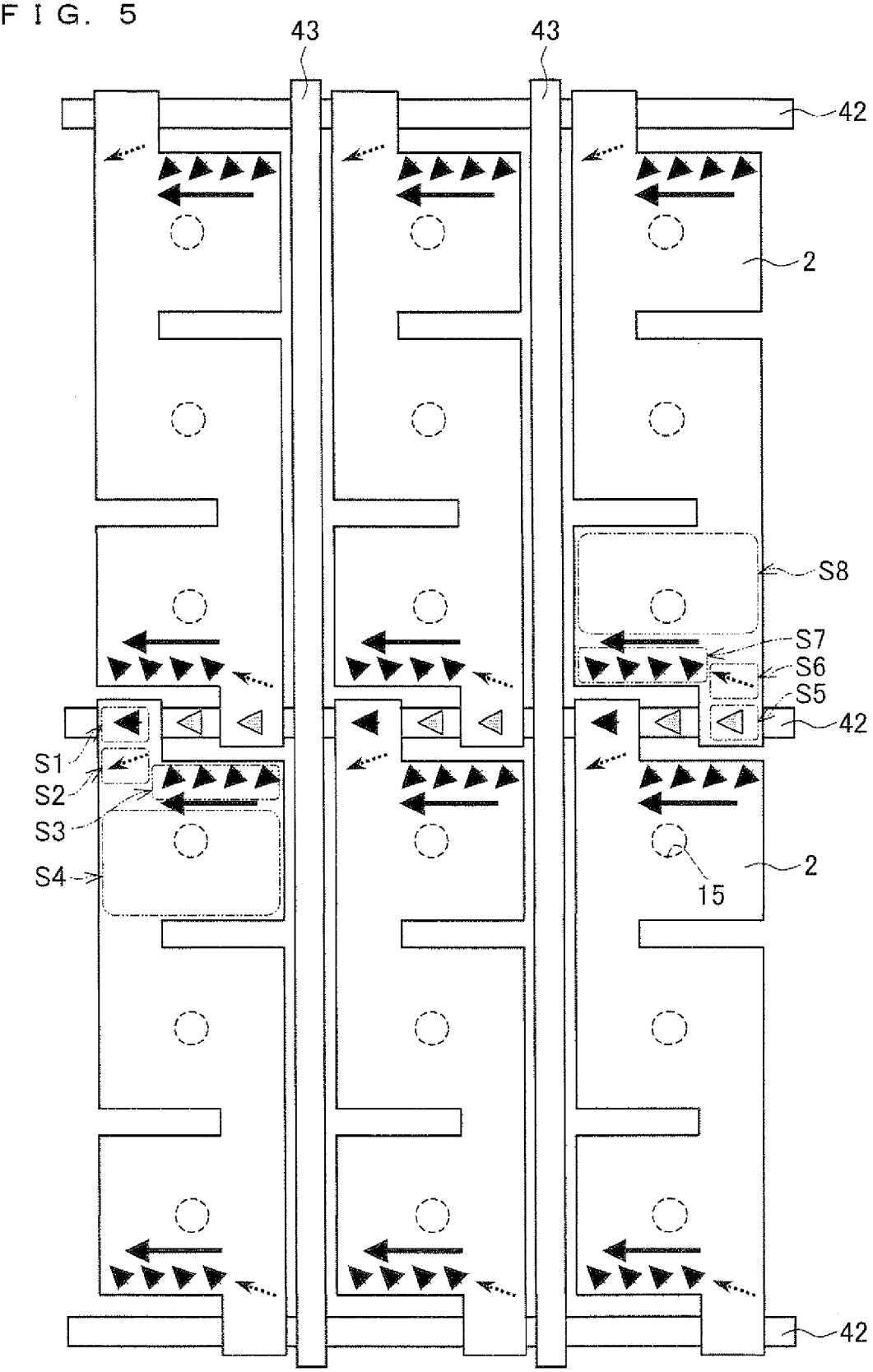
FIG. 5 is a plan view of pixel electrodes in the active matrix liquid crystal display device.

FIG. 5 is a plan view of the pixel electrodes 2 included in the active matrix liquid crystal display device 10 of the present embodiment. The arrows of FIG. 5 show the alignment directions of the liquid crystal molecules 21 in two dimensions: (i) an alignment direction with respect to the planar direction of the liquid crystal panel 5, i.e., with respect to the direction parallel to the thin film transistor-side transparent substrate 1, and to (ii) an alignment direction with respect to the thickness direction of the liquid crystal panel 5.

Specifically, the direction of the arrows indicates the alignment directions of the long axes of the respective liquid crystal molecules 21 with respect to the planar direction of the liquid crystal panel 5. It also indicates that the liquid crystal molecules 21 are tilted so that the end of the long axis of each liquid crystal molecule 21 which end corresponds to the tip of the arrow is tilted toward the counter electrode-side transparent substrate 11.

For example, the arrow shown in the region S1 of FIG. 5 indicates that the long axes of the respective liquid crystal molecules 21 in the region S1 align (i) so as to be parallel to the gate bus line 42 with respect to the planar direction of the liquid crystal panel 5, and (ii) so that the left end of the long axis of each liquid crystal molecule 21 is tilted toward the counter electrode-side transparent substrate 11 with respect to the thickness direction of the liquid crystal panel 5. In other words, the arrows of FIG. 5 indicate even the alignment directions in the dimension shown in FIG. 4 (*a*).

The following description deals with the alignment direction of liquid crystal molecules 21 in the region S2. The region S2 is a region of the pixel electrode 2 which region is adjacent to the position of the pixel electrode 2 from which position a prominence 50 extends. The alignment of the liquid crystal molecules 21 in the region S2 is controlled in a single direction, since the alignment of the liquid crystal molecules 21 in the region S1 of FIG. 3 is controlled in a single direction.

The following description deals with how the alignment direction of the liquid crystal molecules 21 in the region S2 is controlled with reference to FIG. 5.

As described above, the liquid crystal molecules 21 in the region S1 align so that the long axes of the respective liquid crystal molecules 21 are parallel to the gate bus line 42 with respect to the planar direction of the liquid crystal panel 5. With respect to the thickness direction of the liquid crystal panel 5, the liquid crystal molecules 21 in the region S1 align so that the left end of the long axis of each liquid crystal molecule 21 is tilted toward the counter electrode-side transparent substrate 11 with respect to the thickness direction of the liquid crystal panel 5 (see FIG. 4(*a*)).

The alignment of the liquid crystal molecules 21 in the region S1 is propagated to the liquid crystal molecules 21 in the region S2. This propagating of alignment, i.e., the alignment propagation, refers to continuity in the alignment of the liquid crystal molecules. This continuity in the liquid crystal molecule alignment is brought about by the effect that the alignment of a liquid crystal molecule influences an adjacent liquid crystal molecule.

Due to the alignment propagation, the liquid crystal molecules 21 in the region S2 align in the direction indicated by the arrow pointing diagonally lower left as shown in the region S2 of FIG. 5. This alignment propagation is caused by liquid crystal molecules 21 aligning in two directions: (i) the direction in which liquid crystal molecules 21 in the region S4 shown in FIG. 5 align, which region is a region of the pixel electrode 2 adjacent to the center of the pixel electrode 2, i.e., the radial direction in which the liquid crystal molecules 21 align in a vertical alignment in which the liquid crystal molecules 21 are aligned radically around the alignment controlling projection 15, and (ii) the direction in which the liquid crystal molecules 21 in the region S1 align, i.e., the alignment direction indicated by the arrow pointing to the left.

The following description deals with the alignment direction of liquid crystal molecules 21 in the region S3. The liquid crystal molecules 21 in the region S3 of FIG. 5, i.e., in a region of the pixel electrode which region faces the gate bus line, align in the direction indicated by the arrows pointing diagonally lower left as shown in the region 3 of FIG. 5. This is due to alignment propagation from the liquid crystal molecules 21 in the region S2.

As described above, according to the liquid crystal panel 5 of the present embodiment, the alignment of the liquid crystal molecules 21 in the region S1 is controlled first in a single direction. The alignment of the liquid crystal molecules 21 in the region S1 is propagated to the region S2 and then to the region S3. Thus, the respective alignment directions in the regions S1, S2, and S3 are controlled in this order. Note that, in the liquid crystal panel 5 of the present embodiment, since the alignment of the liquid crystal molecules 21 in the region S1 is controlled in a single direction, the alignment in the region S3 is also controlled in a single direction.

This mechanism in which the alignment directions in the pixel electrode 2 are controlled successively due to the alignment propagation functions in the same manner also in a pixel electrode 2 which is positioned opposite from the above pixel electrode 2 across the gate bus line 42. The following description explains how the mechanism functions in the opposite pixel electrode 2 with reference to FIG. 5.

The active matrix liquid crystal display device 10 of the present embodiment includes three regions in the opposite pixel electrode 2 which regions are positioned axisymmetrically across the gate bus line 42 from the following three regions in the pixel electrode 2: the region S1 which overlaps the gate bus line 42; the region S2 which is adjacent to the position of the pixel electrode 2 from which position the prominence 50 extends; and the region S3 which faces the gate bus line 42. Specifically, the three regions in the opposite pixel electrode 2 corresponding to the three regions S1, S2, and S3 are: a region S5 which overlaps the source bus line 43; a region S6 which is adjacent to the position of the opposite pixel electrode 2 from which position a prominence 50 extends; and a region S7 which faces the gate bus line 42.

The mechanism in which the alignment direction in the region S7 is controlled is substantially the same as the mechanism in which the alignment direction in the region S3 is controlled. This will be briefly explained below.

First, liquid crystal molecules 21 in the region S5 align in the direction indicated by the arrow pointing to the left, in the same manner as the liquid crystal molecules 21 in the region S1 align. This is due to the influence of, for example, an electric field generated by the gate bus line 42. The alignment of the liquid crystal molecules 21 in the region S5 is propagated to the region S6. This causes liquid crystal molecules 21 in the region S6 to align in a particular direction. Specifically, the liquid crystal molecules 21 in the region S6 align in the direction indicated by the arrow shown in the region S6 of FIG. 5, i.e., diagonally upper left. This is due to an influence caused by liquid crystal molecules aligning in two directions: the direction in which liquid crystal molecules 21 in the region S8 of FIG. 5 align, which region is a region of the pixel electrode 2 adjacent to the center of the pixel electrode 2, i.e., the radial direction in which the liquid crystal molecules 21 align in a vertical alignment in which the liquid crystal molecules 21 are aligned radically around an alignment controlling projection 15, and (ii) the direction in which the liquid crystal molecules 21 in the region S5 align, i.e., the alignment direction indicated by the arrow pointing to the left. The alignment of the liquid crystal molecules 21 in the region S6 is propagated to the region S7 of FIG. 5, i.e., a region of the pixel electrode 2 which region faces the gate bus line 42. This causes liquid crystal molecules 21 in the region S7 to align in the direction indicated by the arrows shown in the region S7 of FIG. 5, i.e., diagonally upper left.

According the above mechanism, the alignment directions of the liquid crystal molecules 21 in the respective regions S3 and S7 are substantially the same. The regions S3 and S7 are regions of the respective pixel electrodes 2 which regions are positioned opposite from each other across the gate bus line 42 and face the gate bus line 42. Specifically, the liquid crystal molecules 21 in the regions S3 and S7 align so that the long axes of the respective liquid crystal molecules 21 are substantially parallel to the gate bus line 42 with respect to the planar direction of the liquid crystal panel 5. Meanwhile, with respect to the thickness direction of the liquid crystal panel 5, the liquid crystal molecules 21 align so that the left end of the long axis of each liquid crystal molecule is tilted toward the counter electrode-side transparent substrate 11.

As described above, the alignment direction of the liquid crystal molecules 21 in the region S3 is substantially the same as that in the region S7. This allows preventing multiple alignment directions from simultaneously existing in a region of each of the pixel electrodes 2 which region faces the gate bus line 42. Conventionally, this simultaneous existence of multiple alignment directions has caused display irregularity. As a result, it is possible to reduce occurrence of display irregularity and deterioration in the display quality.

Figure 6:
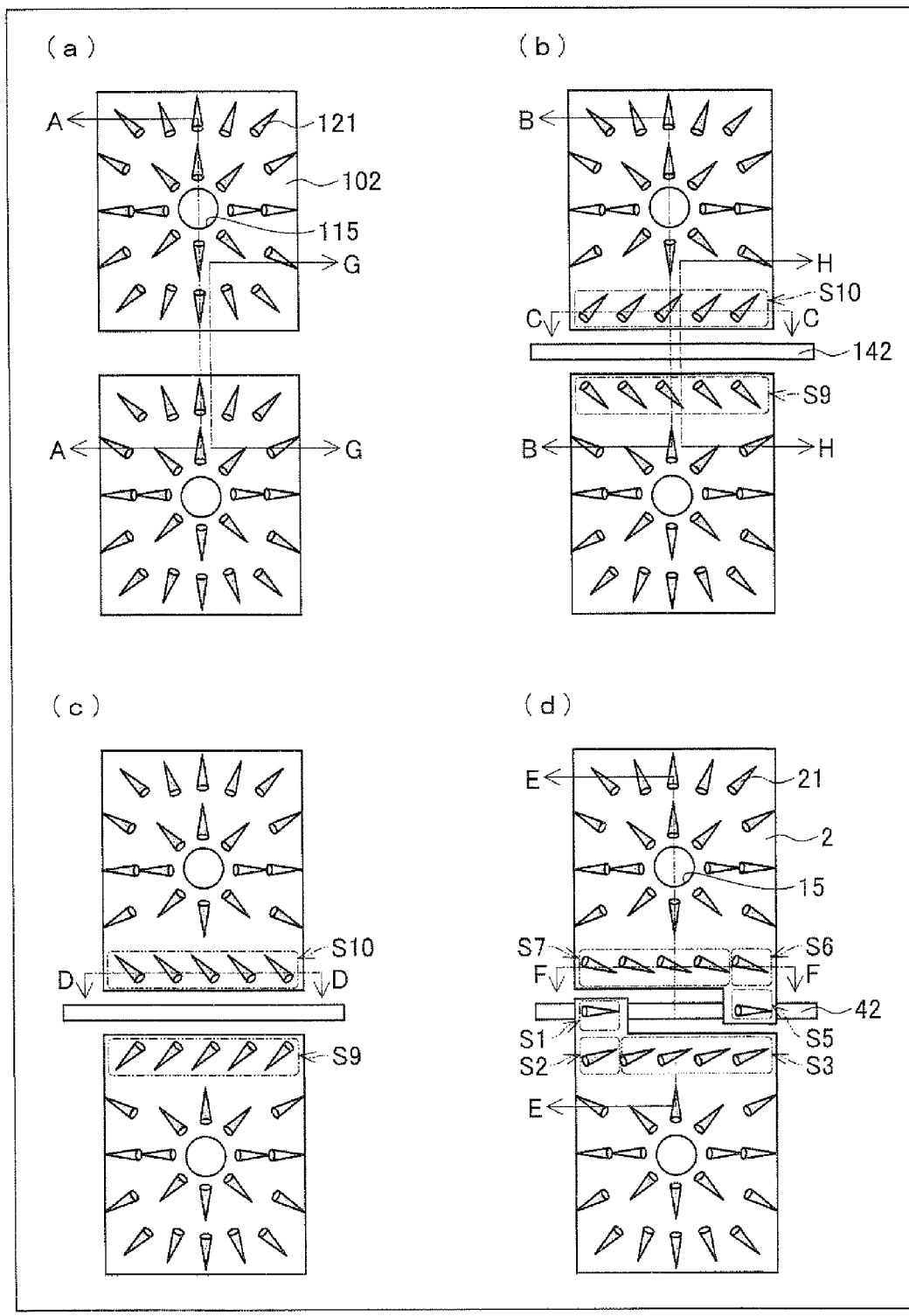
FIG. 6 (a) is a plan view showing the alignment direction of liquid crystal molecules in conventional pixels in which no gate bus line is disposed between adjacent pixel electrodes.

The following description deals with the alignment of the liquid crystal molecules in more detail with reference to FIGS. 6 (a) through 6 (d). FIG. 6 (a) through 6 (d) each show an alignment direction of the liquid crystal molecules 21 in a three-dimensional perspective. The following description also deals with the aperture ratio of the liquid crystal panel 5 with reference to FIGS. 7 (a) through 7 (f).

FIG. 6 (a) shows an alignment direction of liquid crystal molecules 121 in conventional pixels in which no gate bus line 142 is disposed between adjacent pixel electrodes 102. FIGS. 6 (b) and 6 (c) each show an alignment direction of liquid crystal molecules 121 in conventional pixels in which a gate bus line 142 is disposed between adjacent pixel electrodes 102. FIG. 6 (d) shows an alignment direction of the liquid crystal molecules 21 in pixels of the present embodiment, in which a gate bus line 42 is disposed between adjacent pixel electrodes 2.

The cones of FIGS. 6 (a) through 6 (d) show alignment directions of the liquid crystal molecules 21 (121). Specifically, the height directions of the respective cones indicate alignment directions of the long axes of the respective liquid crystal molecules 21 (121) with respect to the planar direction of the liquid crystal panel 5 (105). The direction extending from the apex of each cone toward the bottom side thereof indicates alignment directions of the long axes of the respective liquid crystal molecules 21 (121) with respect to the thickness direction of the liquid crystal panel 5 (105), i.e., the direction extending from the thin film transistor-side transparent substrate 1 (101) toward the counter electrode-side transparent substrate 11 (111).

As shown in FIG. 6 (a), in a conventional active matrix liquid crystal display device 110 in which no gate bus line 142 is provided between adjacent pixel electrodes 102, liquid crystal molecules 121 in each pixel align radially so as to center around an alignment controlling projection 115 which is formed in a substantially central part of the pixel. The radial alignment direction is not distorted in any region of the pixels.

However, in a case where a gate bus line 142 is provided between adjacent pixel electrodes 102 as shown in FIGS. 6 (b) and 6 (c), liquid crystal molecules 121 in each of regions of the respective pixel electrodes 102 which regions face the gate bus line 42, i.e., regions S9 and S10, align in a direction which is not continuous with an alignment direction in the other region of the pixel electrode 102. Specifically, while the liquid crystal molecules 121 in the other region align radially around the alignment controlling projection 115, the liquid crystal molecules 121 in each of the regions S9 and S10 align in a direction which forms an angle of about 45° with the gate bus line 142. This angle refers to an angle defined by the long axes of the respective liquid crystal molecules 121 and the gate bus line 142 with respect to the planar direction of the liquid crystal panel 105.

In the conventional active matrix liquid crystal display device 110 in which a gate bus line 142 is provided between adjacent pixel electrodes 102, the liquid crystal molecules 121 in each of the regions S9 and S10 are discontinuous with the alignment direction in the other region of the pixel electrode 102 and, in addition, two different alignment directions simultaneously exist in each of the regions S9 and 510. Specifically, the two alignment directions shown in FIGS. 6 (b) and FIG. 6 (c), respectively, exist simultaneously. Mixed existence of these two alignment directions in the active matrix liquid crystal display device 110 causes display irregularity.

In contrast to this, according to the active matrix liquid crystal display device 10 of the present embodiment, the alignment of the liquid crystal molecules 21 in each of the regions S1 and S5 is first controlled in a single direction as described above. Subsequently, the alignment direction of the liquid crystal molecules 21 in each of the regions S2 and 56 is controlled due to alignment propagation from the regions S1 and S5, respectively. Finally, the alignment direction of the liquid crystal molecules 21 in each of the regions S3 and S7 is defined due to alignment propagation from the regions S2 and S6, respectively. As a result, the alignment directions of the liquid crystal molecules 21 in the respective regions S3 and S7 are substantially the same. This allows reducing display irregularity.

Figure 7:
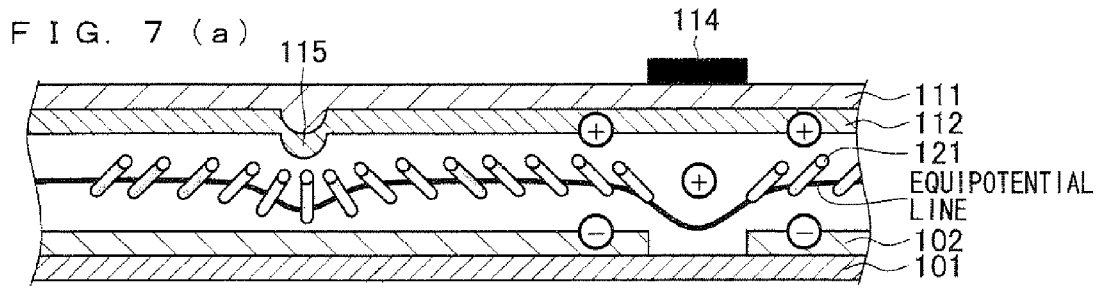
FIG. 7 (a) is a cross-sectional view of the pixels, taken along line A-A of FIG. 6 (a).
Figure 7:
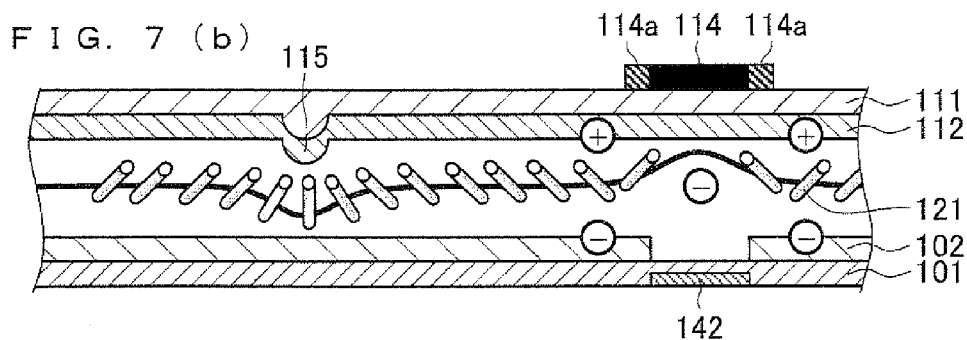
Figure 7:
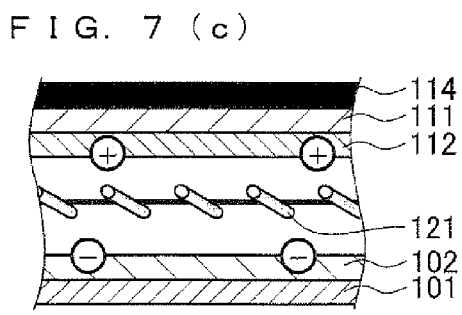
Figure 7:
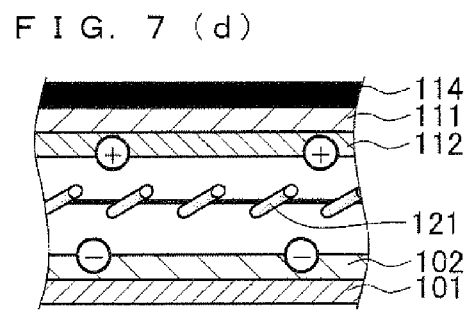
Figure 7:
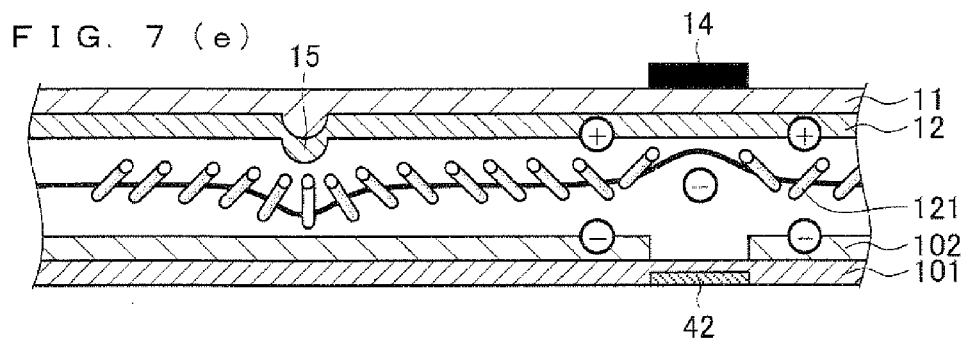
Figure 7:
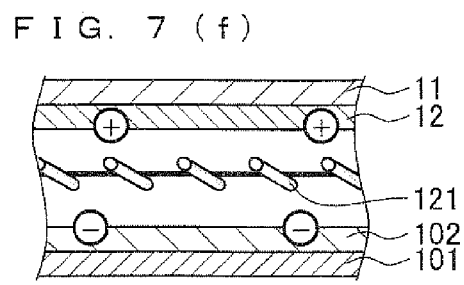

Since display irregularity is reduced, it is possible to reduce the line width of the black matrix serving as the light-blocking member 14 in the active matrix liquid crystal display device 10 of the present embodiment. This allows reducing deterioration in display quality as well as preventing decrease in the aperture ratio, in the active matrix liquid crystal display device 10. The following description deals with the black matrix and the aperture ratio, with reference to FIGS. 7 (a) through 7 (f). FIGS. 7 (a) through 7 (f) show respective cross sections of the active matrix liquid crystal display devices 10 and 110.

FIG. 7 (a) is a cross-sectional view of the pixels in FIG. 6 (a), taken along line A-A. FIG. 7 (b) is a cross-sectional view of the pixels in FIG. 6 (b), taken along line B-B. FIG. 7 (c) is a cross-sectional view of the pixel in FIG. 6 (b), taken along line C-C. FIG. 7 (d) is a cross-sectional view of the pixel in FIG. 6 (c), taken along line D-D. FIG. 7 (e) is a cross-sectional view of the pixels in FIG. 6 (d), taken along line E-E. FIG. 7 (f) is a cross-sectional view of the pixel in FIG. 6 (d), taken along line F-F.

As shown in FIG. 7 (a), in the conventional liquid crystal panel 105 in which no gate bus line is disposed between adjacent pixel electrodes 102, no discontinuity is caused to the alignment direction of the liquid crystal molecules 121 in an edge region of the pixel, i.e., a region in which the adjacent pixel electrodes 102 face each other. Therefore, there is no need to form a black matrix which serves as a light-blocking member 14 and overlaps the pixel electrodes for the purpose of hiding display irregularity caused by discontinuity of the alignment direction.

Meanwhile, in the conventional liquid crystal panel 105 in which a gate bus line 142 is disposed between adjacent pixel electrodes 102, discontinuity is caused to the alignment direction in each of the regions S9 and S10 (see FIG. 7 (b)). The regions S9 and S10 are edge regions of the respective pixels, i.e., regions of the respective pixel electrodes which regions face the gate bus line 142. This discontinuity occurs because a portion of the equipotential line which portion lies above the gate bus line 142 is distorted by the influence of an electric field generated by the gate bus line 142, in such a manner that discontinuity is caused to the alignment direction of the liquid crystal molecules 121.

The liquid crystal molecules 121 in the respective regions S9 and S10, i.e., the regions adjacent to the edges of the respective pixels, may align in one of the two directions shown in FIGS. 7 (c) and 7 (d), respectively. Mixed existence of these two alignment directions causes display irregularity.

Thus, it is necessary to form a black matrix, serving as a light-blocking member 114, which is wide enough to cover the edge regions of the respective pixels. This is necessary in order to hide display irregularity caused by discontinuity of the alignment direction of the liquid crystal molecules 121 in each of the edge regions the respective pixels. Specifically, as shown in FIG. 7 (b), the black matrix serving as the light-blocking member 114 of FIG. 7 (a) needs to be provided with an extension 114a. This unfortunately results in a decreased aperture ratio of the active matrix liquid crystal display device 110.

In contrast, in the liquid crystal panel 5 of the present embodiment, a portion of the equipotential line which portion lies above the gate bus line is distorted in the same manner as in FIG. 7 (b). This then causes discontinuity in the alignment direction of the liquid crystal molecules 21 (see FIG. 7 (e)). However, no simultaneous existence of the two types of discontinuity shown in FIGS. 7 (b) and 7 (c) is caused. In other words, only one type of discontinuity shown in FIG. 7 (f) is caused.

As a result, even if a region in which the alignment direction is discontinuous with the alignment direction in the other region exists in the pixel electrode 2, no display irregularity is caused because such a region has only one type of discontinuity. This eliminates the need to provide an extension 114a to the light-blocking member 14 and thereby prevents decrease in the aperture ratio.

Figure 8:
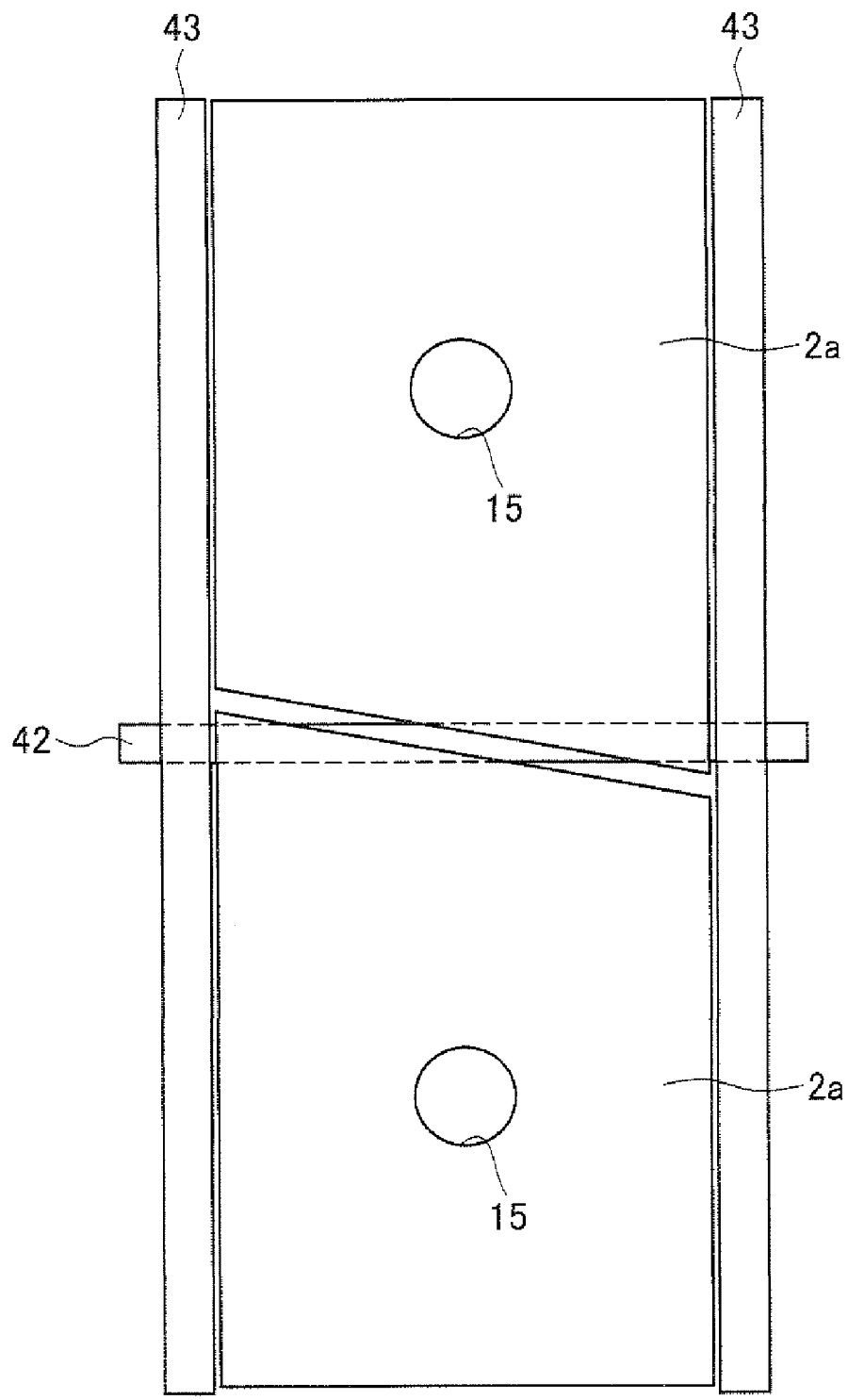
FIG. 8 is a plan view of pixel electrodes in accordance with another embodiment of the present invention.
Figure 9:
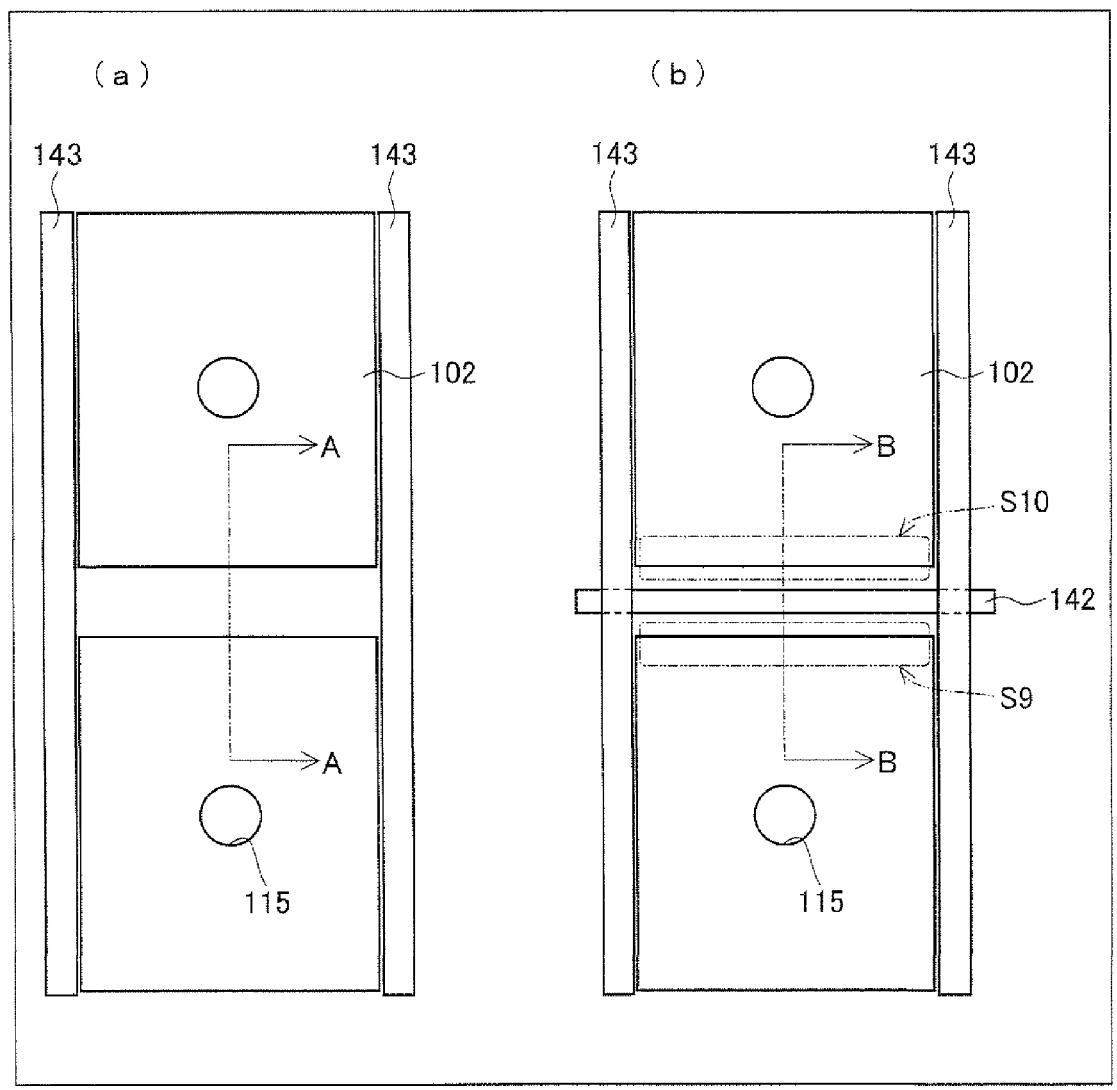
FIG. 9 (a) is a plan view of conventional pixel electrodes in the respective adjacent pixels between which no gate bus line is disposed.
Figure 10:
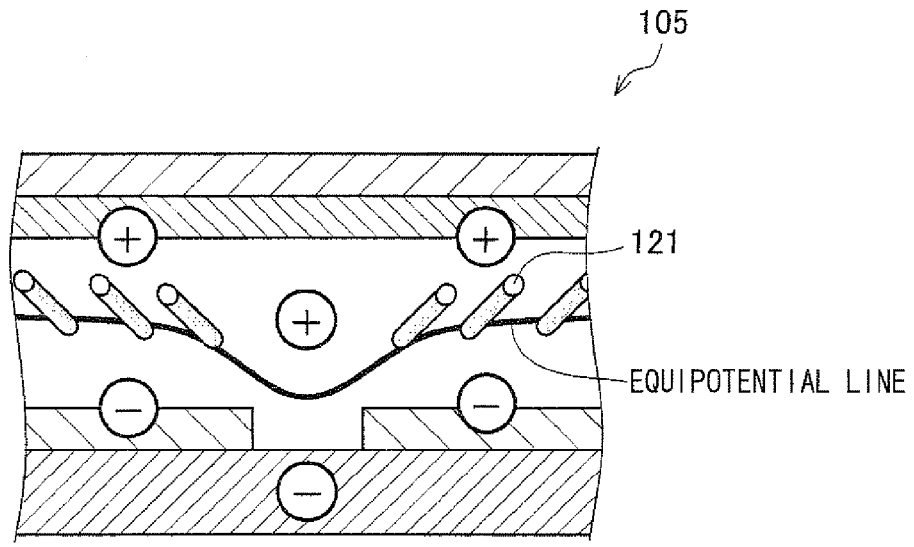
FIG. 10 (a) is a cross-sectional view showing the alignment direction of the liquid crystal molecules, taken along line A-A of FIG. 9 (a).
Figure 10:
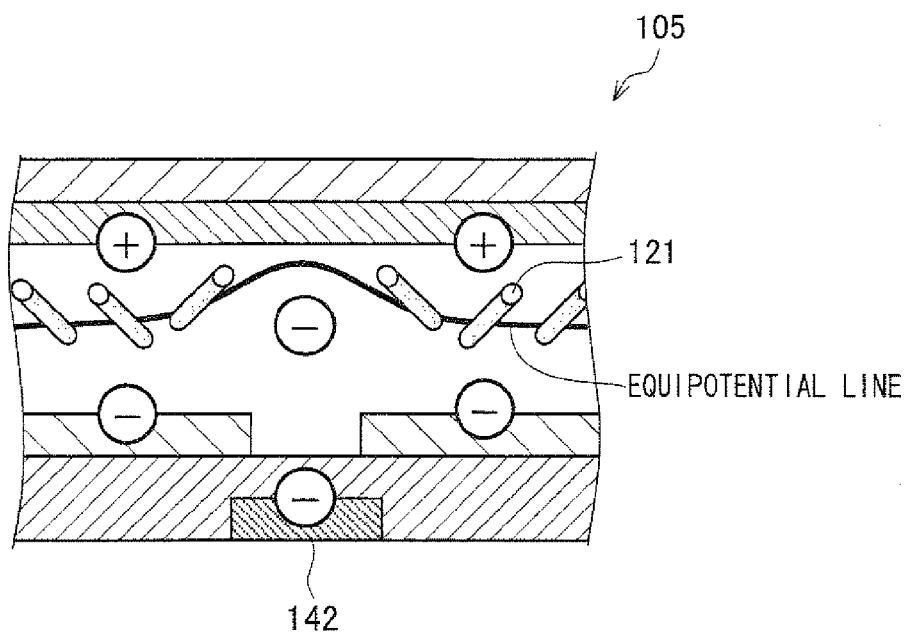

The shape of the prominences 50 of the present invention is not limited to the shape described above. It may be varied in many ways. For example, the pixel electrodes 2 and the prominences 50 may be shaped as shown in FIG. 8. FIG. 8 is a plan view of pixel electrodes 2 in accordance with another embodiment of the present invention. The pixel electrodes 2 shown in FIG. 8 are each provided with a prominence 50 in the shape of a triangle, not a quadrangle.

The prominences 50 of the present invention are not necessarily shaped so as to cross over the gate bus line 42. For example, they may be shaped so as to overlap only one edge of the gate bus line 42.

The bus line in the present invention includes a gate bus line 42 and a source bus line 43. The prominences 50 of the present invention may be shaped so as to overlap either or even both of the gate bus line 42 and the source bus line 43.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, the active matrix liquid crystal display device of the present invention includes a liquid crystal panel including: a plurality of pixel electrodes in array; and a bus line between each adjacent pixel electrode, wherein: each pixel electrode includes a prominence overlapping one of the bus lines which is adjacent to the pixel electrode in a top view; and the prominences of each adjacent pixel electrode facing each other across a certain bus line overlap the certain bus line at positions different from each other with respect to a direction in which the certain bus line extends.

As a result, it is possible to prevent decrease in the aperture ratio, as well as to reduce deterioration in the display quality by preventing liquid crystal molecules in a region of a pixel electrode which region faces a bus line from aligning in two or more directions, in an active matrix liquid crystal display device including a bus line between adjacent pixels.

INDUSTRIAL APPLICABILITY

The present invention allows preventing decrease in the aperture ratio and reducing deterioration in the display quality. Therefore, the present invention is useful when it is required to carry out a bright display or to display a high-resolution image.

The invention claimed is:

1. An active matrix liquid crystal display device of a vertical alignment mode, comprising:
   a liquid crystal panel including:
   a plurality of pixel electrodes in array; and
   a bus line between each adjacent pixel electrode,
   wherein:
   each pixel electrode includes a prominence overlapping one of the bus lines which is adjacent to the pixel electrode in a top view; and the prominences of each adjacent pixel electrode facing each other across a certain bus line overlap the certain bus line at positions different from each other with respect to a direction in which the certain bus line extends;
   wherein said prominence of each said pixel electrode comprises a side that is aligned in the extension direction of the prominence and which is also aligned with a side of the pixel electrode from which the prominence extends, and wherein each of said pixel electrodes has only one prominence overlapping said certain bus line; and
   a width of each prominence is less than a quarter of a width of the pixel electrode along the certain bus line.

2. The active matrix liquid crystal display device according to claim 1, wherein each prominence is disposed across the bus line so as to cover both edges of the bus line.

3. The active matrix liquid crystal display device according to claim 1, wherein the pixel electrodes each includes at least two sub-pixel electrodes.

4. The active matrix liquid crystal display device according to claim 1, the liquid crystal panel further including:
   a counter electrode facing the pixel electrodes; and
   a liquid crystal layer,
   the counter electrode having an alignment controlling projection on a side that faces the liquid crystal layer,
   the alignment controlling projection being disposed at a position opposite from a center of corresponding one of the pixel electrodes.

5. The active matrix liquid crystal display device according to claim 3, the liquid crystal panel further including:
   a counter electrode facing the sub-pixel electrodes; and
   a liquid crystal layer,
   the counter electrode having an alignment controlling projection on a side that faces the liquid crystal layer,
   the alignment controlling projection being disposed at a position opposite from a center of corresponding one of the sub-pixel electrodes.

6. The active matrix liquid crystal display device according to claim 1, the liquid crystal panel further including:
   a counter electrode facing the pixel electrodes,
   the counter electrode having a gap at a position opposite from a center of each of the pixel electrodes.

7. The active matrix liquid crystal display device according to claim 3, the liquid crystal panel further including:
   a counter electrode facing the sub-pixel electrodes,
   the counter electrode having a gap at a position opposite from a center of each of the sub-pixel electrodes.

8. The active matrix liquid crystal display device according to claim 1, wherein at least part of the prominence is disposed in a non-light-blocking region of the liquid crystal panel.

9. The active matrix liquid crystal display device according to claim 2, wherein the prominence has a portion beyond the bus line that the prominence overlaps, and at least part of the portion is disposed in a non light-blocking region of the liquid crystal panel.

10. The active matrix liquid crystal display device according to claim 1, wherein the bus line is a gate bus line.

11. The active matrix liquid crystal display device according to claim 1, wherein the bus line is a source bus line.

12. The active matrix liquid crystal display device according to claim 1, the liquid crystal panel further including:
   a region between each adjacent pixel electrode facing each other across the bus line; and
   a light-blocking member,
   the region including a portion devoid of the prominence,
   the light-blocking member being disposed in the portion.

13. The active matrix liquid crystal display device according to claim 1, wherein said certain bus line is a gate line and respective prominences extending from two pixel electrodes are disposed diagonally with respect to each other across the certain bus line.

14. The active matrix liquid crystal display device according to claim 1, wherein respective prominences unified with each of two pixel electrodes are separated from each other by a substantially constant distance.

* * * * *